US012780329B2

(12) United States Patent
Guilbert et al.

(10) Patent No.: US 12,780,329 B2
(45) Date of Patent: Nov. 3, 2026

(54) REINFORCING ELEMENT FOR REINFORCING A STRUCTURAL ELEMENT

(71) Applicant: SIKA TECHNOLOGY AG, Baar (CH)

(72) Inventors: Thomas Guilbert, Houdeng-Goegnies (BE); Yannick Haegel, Villeneuve d'ascq (FR)

(73) Assignee: SIKA TECHNOLOGY AG, Baar (CH)

( * ) Notice: Subject to any disclaimer, the term of this patent is extended or adjusted under 35 U.S.C. 154(b) by 294 days.

(21) Appl. No.: 18/695,570

(22) PCT Filed: Sep. 22, 2022

(86) PCT No.: PCT/EP2022/076359
§ 371 (c)(1),
(2) Date: Mar. 26, 2024

(87) PCT Pub. No.: WO2023/052231
PCT Pub. Date: Apr. 6, 2023

(65) Prior Publication Data

US 2025/0002093 A1 Jan. 2, 2025

(30) Foreign Application Priority Data

Sep. 28, 2021 (EP) .................................... 21199505

(51) Int. Cl.
*B62D 29/00* (2006.01)

(52) U.S. Cl.
CPC .................................. *B62D 29/002* (2013.01)

(58) Field of Classification Search
CPC .... B62D 29/002; B62D 25/04; B62D 25/025; B62D 25/06
See application file for complete search history.

(56) References Cited

U.S. PATENT DOCUMENTS 6,387,470 B1 5/2002 Chang et al.

FOREIGN PATENT DOCUMENTS

| | | | |
|---|---|---|---|
| EP | 0 204 970 | A2 | 12/1986 |
| EP | 2 883 781 | A1 | 6/2015 |
| EP | 3 486 144 | A1 | 5/2019 |
| EP | 3 486 147 | A1 | 5/2019 |
| KR | 10-2009-0055364 | A | 6/2009 |

(Continued)

OTHER PUBLICATIONS

Translated—8331 (Year: 2013).*

(Continued)

*Primary Examiner* — Huan Le
(74) *Attorney, Agent, or Firm* — Oliff PLC

(57) ABSTRACT

A reinforcing element for reinforcing a structural element of a motor vehicle includes a carrier and an expandable material arranged thereon. The carrier has a first side wall and a second side wall, and an intermediate member connecting the side walls. The reinforcing element is produced by an injection molding process, wherein the side walls are oriented substantially in a demolding direction of the injection molding process. The side walls each have on their outer sides a first region and a second region, wherein the first region is covered with expandable material and the second region is not covered with expandable material.

18 Claims, 3 Drawing Sheets

(56) References Cited

FOREIGN PATENT DOCUMENTS

| | | | | |
|---|---|---|---|---|
| WO | 03/026947 | A1 | 4/2003 | |
| WO | WO-2013168331 | A1 * | 11/2013 | ........... B62D 29/002 |
| WO | 2015/157250 | A1 | 10/2015 | |

OTHER PUBLICATIONS

Dec. 14, 2022 International Search Report issued in International Patent Application No. PCT/EP2022/076359.

Apr. 2, 2024 International Preliminary Report on Patentability issued in International Patent Application No. PCT/EP2022/076359.

* cited by examiner

REINFORCING ELEMENT FOR REINFORCING A STRUCTURAL ELEMENT

The invention relates to a reinforcing element for reinforcing a structural element in a motor vehicle.

In many cases, components such as, for example, vehicle bodies and/or frames of means of transport and locomotion, especially of water or land vehicles or of aircraft, have structures with cavities in order to enable lightweight constructions. However, these cavities cause a wide variety of problems. Depending on the type of the cavity, the latter has to be sealed in order to prevent the ingress of moisture and soiling, which can lead to corrosion of the components. It is often also desirable to substantially reinforce the cavities and hence the component, but to maintain the low weight. It is often also necessary to stabilize the cavities and hence the components, in order to reduce noise which would otherwise be transmitted along or through the cavity. Many of these cavities have an irregular shape or a narrow extent, which makes it more difficult to seal, reinforce and insulate them properly.

Especially in automotive construction, but also in aircraft construction and boatbuilding, sealing elements (baffles) are therefore used in order to seal and/or acoustically insulate cavities, or reinforcing elements (reinforcers) are used in order to reinforce cavities.

Figure 1:
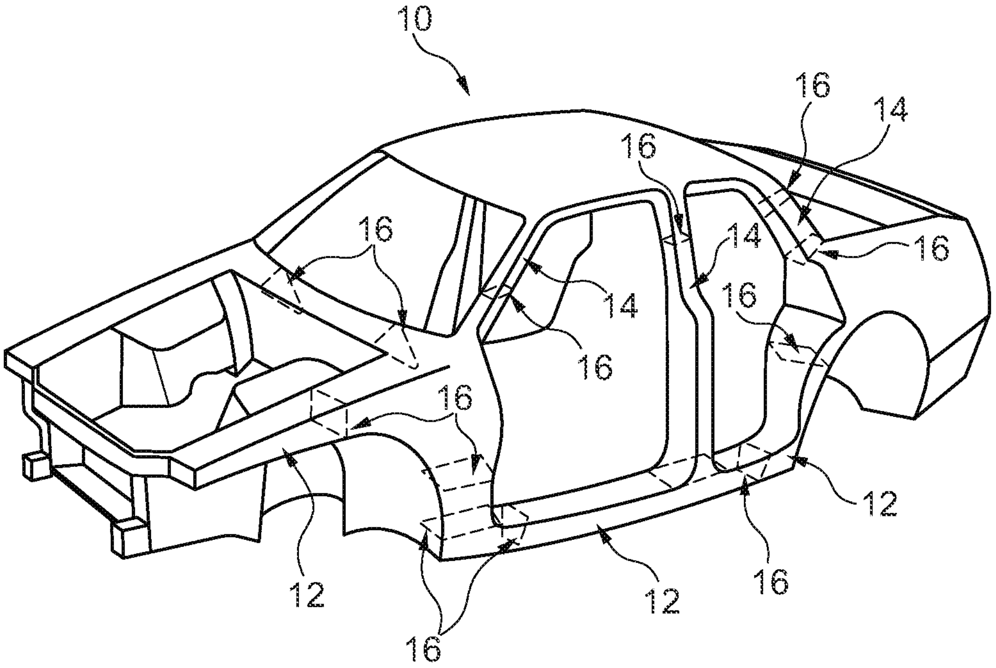

FIG. 1 shows schematically a body of an automobile. The vehicle body 10 here has various structures with cavities, for example pillars 14 and beams or crossbeams 12. Such structural elements 12, 14 with cavities are typically sealed and/or reinforced using sealing elements and reinforcing elements 16 respectively.

A disadvantage of such and similar known reinforcing elements is that, on foaming of a foam material in order to bond the carrier to the structural element, too much foam is often formed, which then also penetrates into regions where it is undesirable. This problem can be more or less pronounced depending on the position of the reinforcing element with respect to gravity and depending on the dimensioning of the reinforcing element.

Accordingly, the invention is based on the object of providing an improved reinforcing element which in particular prevents excessive foaming and which additionally enables foaming in a predefined space.

This object is achieved by a reinforcing element for reinforcing a structural element of a motor vehicle, the reinforcing element comprising: a carrier which has a first side wall and a second side wall, and an intermediate member connecting the side walls; and an expandable material which has an expansion rate of not more than 500% and which is arranged on an outer side of each of the side walls; wherein the reinforcing element is produced by an injection molding process, and wherein the side walls are oriented substantially in a demolding direction of the injection molding process, and wherein the first and/or the second side wall has on the outer side a first region which is covered with expandable material and a second region, adjoining this first region in the demolding direction, which is not covered with expandable material.

This solution firstly has the advantage that, by providing a second region which is not covered with expandable material, a zone is created between the carrier and the structural element in which the expandable material can purposively spread on expansion. As a result, the expandable material is able to foam both in the direction of the structural element and transverse to that direction without leaving a desired foaming region. As a result, the expandable material can reliably be prevented from leaving a region between the side walls of the carrier and a respective adjacent wall of the structural element on foaming.

A further advantage is to be seen in that, as a result of this purposive arrangement of the expandable material in specific regions of the outer sides of the side walls of the carrier, the expandable material can be used more purposively and more efficiently. As a result, a material usage of the expandable material can be optimized and reduced overall, whereby a cost advantage is obtained.

In addition, as a result of this purposive foaming into a designated zone, which is present at the side of the expandable material on the carrier, it can be achieved that no material is able to penetrate into undesired regions of the structural element on expansion.

In the context of this invention, the term "expansion rate" describes the proportion of the original volume of the expandable material which is added by the expansion process.

Accordingly, in the case of an expansion rate of 100%, a volume is doubled by the expansion (existing volume plus 100% of the existing volume), in the case of an expansion rate of 300%, a volume is quadrupled by the expansion (existing volume plus 300% of the existing volume).

In one exemplary embodiment, the side walls are inclined by not more than 10° from the demolding direction. In an exemplary development, the side walls are inclined by not more than 8° from the demolding direction, in particular inclined by not more than 6° from the demolding direction.

Because the side walls run substantially along the demolding direction, it is often necessary to angle these side walls slightly relative to the demolding direction in order that the injection-molded part can be released from the mold. In order nevertheless to permit side walls that run as parallel as possible, this angle of the side walls relative to the demolding direction is advantageously kept as small as possible.

In tests, it has been shown that an angle of approximately 5° relative to the demolding direction both permits demolding in the injection molding process and results in only a small deviation of the two side walls from parallelism relative to one another.

In one exemplary embodiment, the intermediate member is formed substantially perpendicular to the demolding direction.

In one exemplary embodiment, the intermediate member is in the form of a continuous plate which extends between the two side walls.

In an alternative exemplary embodiment, the intermediate member consists of a plurality of rib-like structures which connect the two side walls together.

In one exemplary embodiment, the intermediate member lies substantially in a plane.

In an alternative embodiment, the intermediate member is of irregular shape and does not lie in a plane.

In one exemplary embodiment, the first and/or the second side wall has a step between the first region and the second region.

In an exemplary development, this step has a height of between 0.5 mm and 2 mm, measured perpendicular to the demolding direction.

The provision of such a step has the advantage that a stop point for the upper mold half of the injection mold is thus formed for the injection molding process. As a result, the expandable material which is subsequently injected can be injected into a tightly closed chamber.

By keeping the height of this step as small as possible, the positive effect can be used for the injection molding process without any substantial change in the overall mode of action of the reinforcing element in the structural element.

In one exemplary embodiment, a width of the second region, measured in the demolding direction, is between 10% and 50% of a width of the first region, measured in the demolding direction.

In an exemplary development, the width of the second region is between 20% and 40% of a width of the first region.

In one exemplary embodiment, the width of the first region is between 3 mm and 50 mm, preferably between 8 mm and 30 mm.

In one exemplary embodiment, the width of the second region is between 1 mm and 20 mm, preferably between 3 mm and 10 mm.

In one exemplary embodiment, a wall is formed on the outer side of the first and/or second side wall, said wall being arranged adjoining the first region in the demolding direction, wherein the wall and the second region are each located on opposite sides of the first region.

In an exemplary development, the wall and the expandable material have substantially the same height.

In one exemplary embodiment, the wall and the expandable material are flush on an outer side.

The provision of such a wall on the outer sides of the side walls has the advantage that an expansion of the expandable material can thus be directed to the side on which the free second region is arranged. As a result, an expansion of the expandable material can purposively be directed against the panel sheet of the structural element and in the direction of the second region of the side wall.

In one exemplary embodiment, the first and second side walls are arranged around the intermediate member and form a continuous side wall of the carrier.

Such a continuous side wall has the advantage that the carrier of the reinforcing element can thus be bonded to the structural element by the expandable material over its entire cross section.

In one exemplary embodiment, the expandable material has a thickness of 2 mm to 5 mm, measured perpendicular to the demolding direction.

In one exemplary embodiment, the carrier is formed of a plastic, in particular of polyamide.

In an exemplary development, the carrier is formed of a fiber-reinforced plastic, in particular of a glass-reinforced plastic.

In one exemplary embodiment, the expandable material has an expansion rate of not more than 400%, preferably of not more than 300%, more preferably of not more than 250%.

In principle, various types of material that can be made to foam can be used as the expandable material. This material can preferably have reinforcing properties.

Such an expandable material typically has a chemical or a physical blowing agent. Chemical blowing agents are organic or inorganic compounds which decompose under the influence of temperature, moisture or electromagnetic radiation, wherein at least one of the decomposition products is a gas. Physical blowing agents used may, for example, be compounds that are converted to the gaseous state of matter with increasing temperature. As a result, both chemical and physical blowing agents are capable of creating foam structures in polymers.

The expandable material is preferably foamed thermally, using chemical blowing agents. Examples of suitable chemical blowing agents are azodicarbonamides, sulfohydrazides, hydrogencarbonates or carbonates.

Suitable blowing agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material can preferably be foamed at a temperature of ≤200° C., in particular from 120° C. to 190° C., preferably from 160° C. to 180° C.

Suitable expandable materials are, for example, one-component epoxy resin systems which do not flow at room temperature and in particular have elevated impact resistance and contain thixotropic agents such as aerosils or nanoclays. For example, epoxy resin systems of this type include 20% to 50% by weight of a liquid epoxy resin, 0% to 30% by weight of a solid epoxy resin, 5% to 30% by weight of impact modifiers, 1% to 5% by weight of physical or chemical blowing agents, 10% to 40% by weight of fillers, 1% to 10% by weight of thixotropic agents and 2% to 10% by weight of heat-activatable curing agents. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing blowing agents and based on crystalline polyesters which have OH groups and have been mixed with further polyols, preferably polyether polyols, and polyisocyanates with blocked isocyanate groups. The melting point of the crystalline polyester should be ≥50° C. The isocyanate groups of the polyisocyanate may be blocked, for example, by nucleophiles such as caprolactam, phenols or benzoxalones. Also suitable are blocked polyisocyanates as used, for example, in powder-coating technology, and commercially available, for example, under the Vestagon® BF 1350 and Vestagon® BF 1540 trade names from Degussa GmbH, Germany. Likewise suitable as isocyanates are so-called encapsulated or surface-deactivated polyisocyanates which are known to a person skilled in the art and are described, for example, in EP 0 204 970.

One exemplary expandable material with reinforcing properties is marketed under the trade name SikaReinforcer® 941 by Sika Corp., USA. This is furthermore described in U.S. Pat. No. 6,387,470.

The object stated at the beginning is additionally achieved by a system of a reinforced structural element of a motor vehicle, the system comprising: a reinforcing element according to the above description; and a structural element which comprises a first panel sheet and a second panel sheet, wherein there is a cavity between the panel sheets; wherein the reinforcing element is arranged in a cavity of the structural element so that the demolding direction of the reinforcing element runs substantially in the direction of a longitudinal axis of the cavity.

In one exemplary embodiment, the reinforcing element is configured such that the second region is free of expandable material prior to expansion of the expandable material and is completely covered with expandable material after expansion of the expandable material.

In one exemplary embodiment, the reinforcing element is configured and arranged in the structural element such that, after expansion of the expandable material, the two regions are bonded to the structural element by the expandable material over their entire surfaces.

In one exemplary embodiment, a distance between the reinforcing element and the structural element is between 1 mm and 8 mm, preferably between 1 mm and 6 mm, more preferably between 2 mm and 4 mm.

Figure 2A:
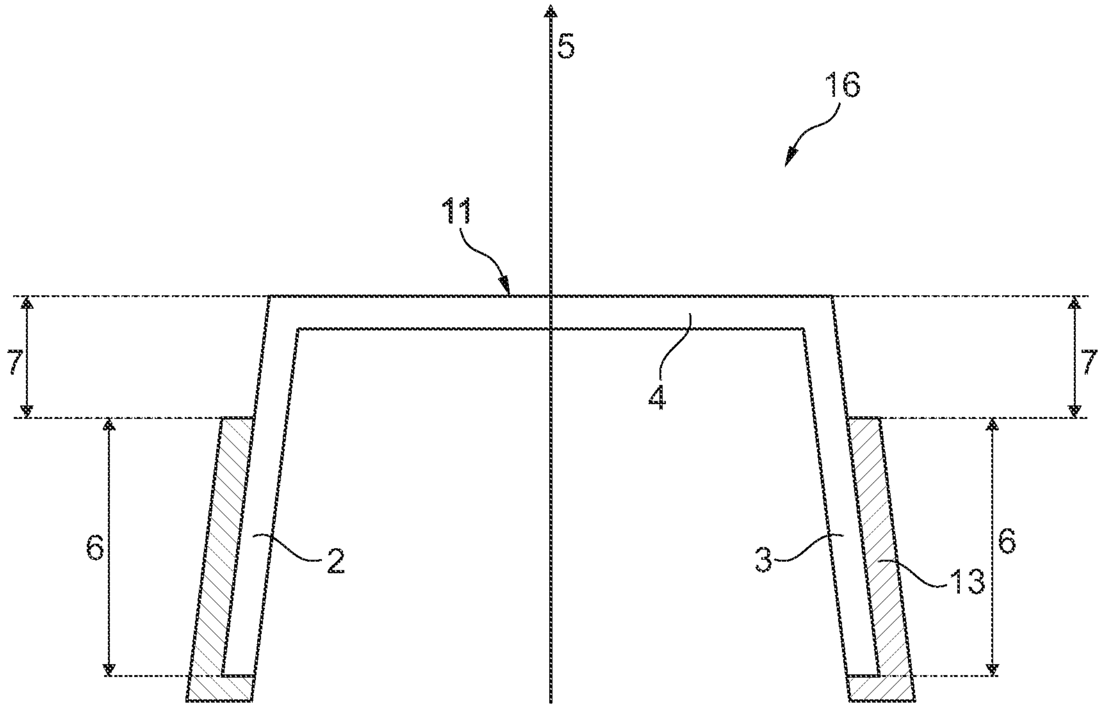
Figure 2B:
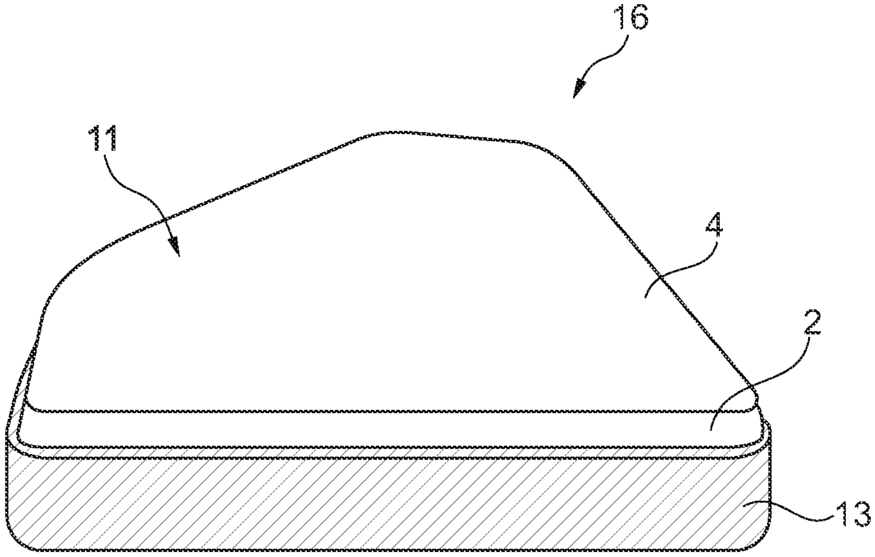

Details and advantages of the invention will be described hereinafter by means of exemplary embodiments and with reference to schematic drawings. In the drawings:

FIG. 1 shows an exemplary illustration of a vehicle body;

FIGS. 2*a* and 2*b* show an exemplary illustration of a reinforcing element; and FIGS. 3*a* to 4*b* show an exemplary illustration of a system of a reinforced structural element.

FIGS. 2*a* to 2*b* illustrate a reinforcing element 16 schematically and by way of example. The reinforcing element 16 is shown in a cross-sectional illustration in FIG. 2*a*, and the same reinforcing element 16 is shown in a spatial illustration in FIG. 2*b*.

The reinforcing element 16 has a carrier 11 which comprises a first side wall 2, a second side wall 3, and an intermediate member 4. Expandable material 13 is arranged on outer sides of the side walls 2, 3. The outer sides of the side walls 2, 3 each have a first region 6 and a second region 7 which are arranged adjoining one another in the demolding direction 5. The expandable material 13 is arranged only in the first regions 6, but not in the second regions 7. This has the result that, on expansion of the expandable material 13, the expandable material foams in the direction of the structural element, but also in the direction of the second regions 7. As a result, the regions in the cavity of the structural element that are filled with expanded material after expansion of the expandable material 13 can better be defined.

The reinforcing element 16 in this exemplary embodiment has a demolding direction 5. For better demolding in the injection molding tool, the side walls 2, 3 are angled slightly relative to the demolding direction 5. It is often desirable to form the side walls 2, 3 as parallel to one another as possible. As small an angle as possible to the demolding direction 5 is therefore chosen, in order to permit clean demolding from the injection molding tool.

Figure 3A:
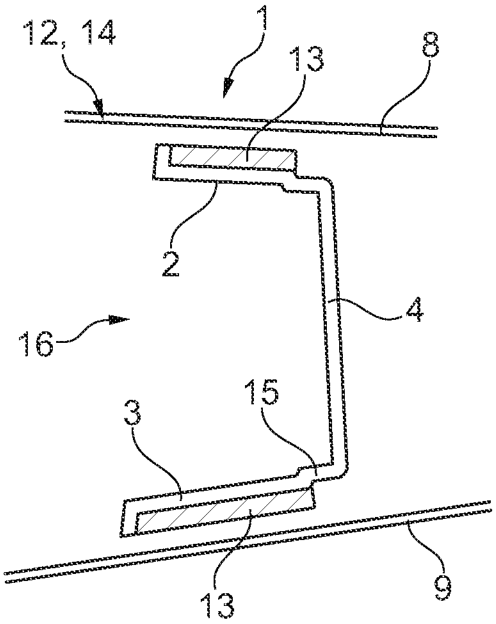
Figure 3B:
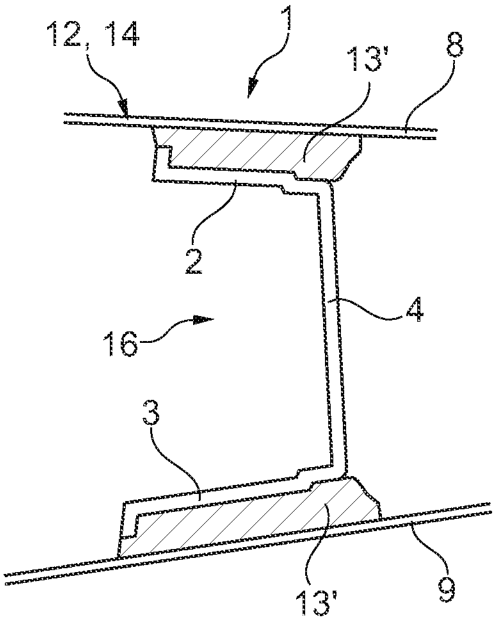
Figure 4A:
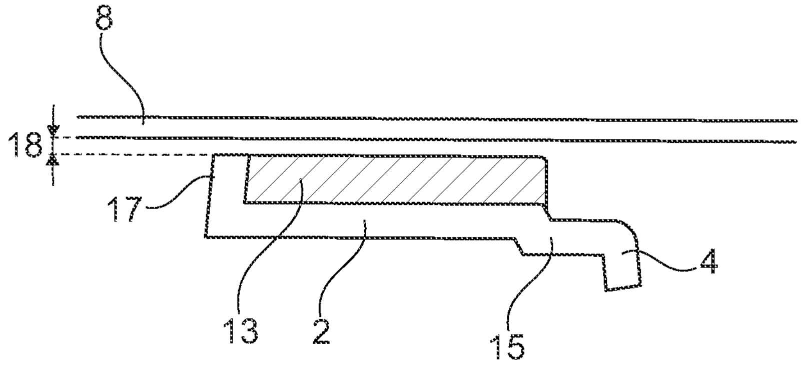
Figure 4B:
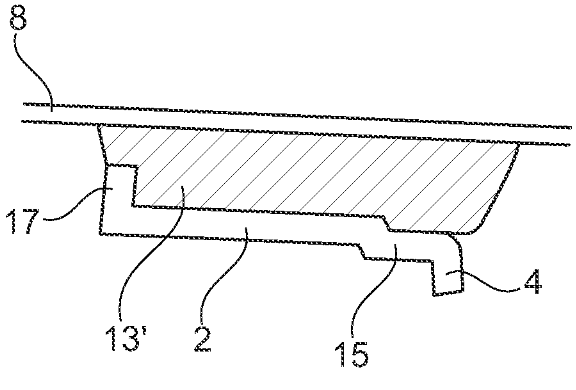

A reinforcing element 16 in a structural element 12, 14 is illustrated in each of FIGS. 3*a* to 4*b*. FIGS. 3*a* and 4*a* each illustrate a state prior to expansion of the expandable material 13, and FIGS. 3*b* and 4*b* each illustrate a state after expansion of the expandable material 13, so that the expanded material 13' is visible.

In this exemplary embodiment, unlike in the exemplary embodiment in FIGS. 2*a* and 2*b*, the carrier 11 has both a step 15 in the side walls 2, 3 and a wall 17 on the outer sides of the side walls 2, 3.

The wall 17, which is arranged directly adjoining the expandable material 13, has the effect that, on expansion, the expandable material 13 expands both in the direction of the panel sheets 8, 9 of the structural element 12, 14 and in the direction of the free second regions of the outer sides of the side walls 2, 3. As a result, it can be achieved that the expanded material 13 is directed into the desired zones between the carrier 11 and the panel sheets 8, 9 of the structural element 12, 14.

A distance 18 is provided between the reinforcing element 16 and the structural element 12, 14. This distance is preferably approximately 3 mm to 5 mm. As a result, it can be ensured that the panel sheets 8, 9 can be coated prior to expansion of the expandable material 13, and that at the same time mechanically robust bonding of the carrier 11 to the structural element 12, 14 by the expanded material 13' can be achieved.

LIST OF REFERENCE SIGNS

1 System
2 First side wall
3 Second side wall
4 Intermediate member
5 Demolding direction
6 First region
7 Second region
8 First panel sheet
9 Second panel sheet
10 Vehicle body
11 Carrier
12 Structural element
13 Expandable material
13' Expanded material
14 Structural element
15 Step
16 Reinforcing element
17 Wall
18 Distance

The invention claimed is:

1. A reinforcing element for reinforcing a structural element of a motor vehicle, the reinforcing element comprising:

a carrier which has a first side wall, a second side wall, and an intermediate member connecting the first and second side walls to each other; and an expandable material which has an expansion rate of not more than 500% and which is arranged on an outer side of each of the first and second side walls, wherein the reinforcing element is produced by an injection molding process, and the first and second side walls are oriented substantially in a demolding direction of the injection molding process, the first side wall and/or the second side wall has on the outer side a first region which is covered with the expandable material and a second region, adjoining the first region in the demolding direction, which is not covered with the expandable material, and the first side wall and/or the second side wall has a step between the first region and the second region.

2. The reinforcing element as claimed in claim 1, wherein the first and second side walls are inclined by not more than 10° from the demolding direction.

3. The reinforcing element as claimed in claim 1, wherein the intermediate member is oriented substantially perpendicular to the demolding direction.

4. The reinforcing element as claimed in claim 1, wherein the step has a height of between 0.5 mm and 2 mm, measured perpendicular to the demolding direction.

5. The reinforcing element as claimed in claim 1, wherein a width of the second region, measured in the demolding direction, is between 10% and 50% of a width of the first region, measured in the demolding direction.

6. The reinforcing element as claimed in claim 1, wherein a width of the first region, measured in the demolding direction, is between 3 mm and 50 mm, and/or a width of the second region, measured in the demolding direction, is between 1 mm and 20 mm.

7. The reinforcing element as claimed in claim 1, wherein a wall is formed on the outer side of the first side wall and/or the second side wall, the wall being arranged adjoining the first region in the demolding direction, the wall and the second region are each located on opposite sides of the first region.

8. The reinforcing element as claimed in claim 7, wherein the wall and the expandable material have substantially a same height.

9. The reinforcing element as claimed in claim 1, wherein the first and second side walls are arranged around the intermediate member and form a continuous side wall.

10. The reinforcing element as claimed in claim 1, wherein the expandable material has a thickness of 2 mm to 5 mm, measured perpendicular to the demolding direction.

11. A system of a reinforced structural element of a motor vehicle, the system comprising:

the reinforcing element as claimed in claim 1; and a structural element which comprises a first panel sheet and a second panel sheet, a cavity located between the first and second panel sheets, wherein the reinforcing element is arranged in the cavity of the structural element so that the demolding direction of the reinforcing element runs substantially in a direction of a longitudinal axis of the cavity.

12. The system as claimed in claim 11, wherein the reinforcing element is configured such that the second region is free of the expandable material prior to expansion of the expandable material and is completely covered with expanded material after expansion of the expandable material.

13. The system as claimed in claim 12, wherein the reinforcing element is configured and arranged in the structural element such that, after the expansion of the expandable material, the first and second regions are bonded to the structural element by the expanded material over their entire surface.

14. The system as claimed in claim 11, wherein a distance between the reinforcing element and the structural element is between 1 mm and 8 mm.

15. The reinforcing element as claimed in claim 1, wherein the carrier is made of an injection-moldable plastic material.

16. The reinforcing element as claimed in claim 1, wherein the second region is located between the first region and the intermediate member.

17. The reinforcing element as claimed in claim 1, wherein at least a portion of the step is not covered by the expandable material.

18. The reinforcing element as claimed in claim 1, wherein the expandable material is configured to completely cover the second region after expansion of the expandable material.

* * * * *